(12) United States Patent
Zhou

(10) Patent No.: US 11,760,436 B2
(45) Date of Patent: Sep. 19, 2023

(54) FOLDABLE STRUCTURE, FOLDABLE DEVICE AND FOLDABLE VEHICLE

(71) Applicant: BEIJING XIAOMI MOBILE SOFTWARE CO., LTD., Beijing (CN)

(72) Inventor: Juguo Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 274 days.

(21) Appl. No.: 17/231,830

(22) Filed: Apr. 15, 2021

(65) Prior Publication Data
US 2022/0055710 A1    Feb. 24, 2022

(30) Foreign Application Priority Data
Aug. 21, 2020   (CN) .......................... 202010852570.9

(51) Int. Cl.
*B62K 15/00*  (2006.01)
*B62K 3/00*   (2006.01)

(52) U.S. Cl.
CPC ............ *B62K 15/006* (2013.01); *B62K 3/002* (2013.01)

(58) Field of Classification Search
CPC ....... B62K 3/003; B62K 15/006; B62K 3/002
See application file for complete search history.

(56) References Cited

U.S. PATENT DOCUMENTS

| 5,337,609 A | * | 8/1994 | Hsu | .......................... | B62K 21/24 |
| | | | | | 280/278 |
| 5,440,948 A | * | 8/1995 | Cheng | .................. | B62K 15/006 |
| | | | | | 280/278 |
| 5,492,350 A | * | 2/1996 | Pan | ...................... | B62K 15/006 |
| | | | | | 280/278 |
| 5,906,452 A | * | 5/1999 | Lee | ...................... | B62K 15/006 |
| | | | | | 403/325 |

(Continued)

FOREIGN PATENT DOCUMENTS

| CN | 2934695 Y | 8/2007 |
| CN | 210592288 U | 5/2020 |
| CN | 112109835 A | 12/2020 |
| DE | 202014101515 U1 | 6/2014 |

OTHER PUBLICATIONS

Indian Patent Application No. 202144018592, Office Action dated Mar. 25, 2022, 6 pages.

(Continued)

*Primary Examiner* — Katy M Ebner
(74) *Attorney, Agent, or Firm* — COZEN O'CONNOR

(57) ABSTRACT

A foldable structure includes: a first folding seat; a second folding seat rotatably connected with the first folding seat and including a position limiting boss; and a locking assembly including a locking buckle and an unlocking part connected with each other, which are rotatably connected with the first folding seat, respectively. When the foldable structure is in an unlocked state, and the first folding seat rotates around the second folding seat in a first direction, the locking buckle moves along with the first folding seat to be (Continued)

engaged with the second folding seat and the unlocking part moves to abut against the position limiting boss, so that the foldable structure is switched to a pre-locked state where the position limiting boss prevents the unlocking part from rotating around the first folding seat to unlock the locking buckle.

12 Claims, 5 Drawing Sheets

(56) References Cited

U.S. PATENT DOCUMENTS

| | | | |
|---|---|---|---|
| 6,293,575 B1* | 9/2001 | Burrows | B62K 15/006 |
| | | | 280/278 |
| 9,321,500 B2* | 4/2016 | Wang | B62K 15/006 |
| 9,371,108 B2* | 6/2016 | Betti | B62K 15/006 |
| 9,533,730 B2* | 1/2017 | Yu | B62K 19/18 |
| 9,902,453 B2* | 2/2018 | Uimonen | B62K 15/006 |
| 11,148,747 B2* | 10/2021 | Poupart | B62K 21/12 |
| 2022/0033029 A1* | 2/2022 | Wang | B62K 21/16 |
| 2022/0234673 A1* | 7/2022 | Wang | B62K 15/006 |

OTHER PUBLICATIONS

European Patent Application No. 21170185.9, extended search and opinion dated Sep. 24, 2021, 8 pages.

* cited by examiner

FOLDABLE STRUCTURE, FOLDABLE DEVICE AND FOLDABLE VEHICLE

CROSS-REFERENCE TO RELATED APPLICATION

This application claims the benefit of priority to Chinese patent Application No. 202010852570.9, filed on Aug. 21, 2020, the content of which is incorporated herein by reference in its entirety.

TECHNICAL FIELD

The present disclosure relates to a field of terminals, and more particularly, to a foldable structure, a foldable device and a foldable vehicle.

BACKGROUND

Due to its foldability, a foldable structure occupies a smaller space when stored and is portable, while being capable of meeting the basic requirements of functionality. As a result, foldable structure is widely used in different kinds of devices. However, due to the foldability of the foldable structure, a foldable structure may be accidentally folded while performing its normal functions.

SUMMARY

The present disclosure provides a foldable structure, a foldable device and a foldable vehicle to solve certain deficiencies in the related art.

According to a first aspect of the embodiments of the present disclosure, a foldable structure is provided, and includes: a first folding seat; a second folding seat rotatably connected with the first folding seat and having a position limiting boss; and a locking assembly having a locking buckle and an unlocking part connected with the locking buckle, the locking buckle and the unlocking part being rotatably connected with the first folding seat, respectively. The locking buckle is configured to move along with the first folding seat to be engaged with the second folding seat and the unlocking part is configured to move to abut against the position limiting boss when the foldable structure is in an unlocked state and the first folding seat rotates around the second folding seat in a first direction, to allow for the foldable structure to be switched to a pre-locked state. The position limiting boss is configured to prevent the unlocking part from rotating around the first folding seat to unlock the locking buckle in the pre-locked state.

According to a second aspect of the embodiments of the present disclosure, a foldable device is provided, and includes a foldable structure. The foldable structure includes: a first folding seat; a second folding seat rotatably connected with the first folding seat and having a position limiting boss; and a locking assembly having a locking buckle and an unlocking part connected with the locking buckle, the locking buckle and the unlocking part being rotatably connected with the first folding seat, respectively. The locking buckle is configured to move along with the first folding seat to be engaged with the second folding seat and the unlocking part is configured to move to abut against the position limiting boss when the foldable structure is in an unlocked state and the first folding seat rotates around the second folding seat in a first direction, to allow for the foldable structure to be switched to a pre-locked state. The position limiting boss is configured to prevent the unlocking part from rotating around the first folding seat to unlock the locking buckle in the pre-locked state.

According to a third aspect of the embodiments of the present disclosure, a foldable vehicle is provided, and includes a foldable structure, a handlebar, a front fork, a rear fork, a deck, a front wheel and a rear wheel. The foldable structure includes: a first folding seat; a second folding seat rotatably connected with the first folding seat and having a position limiting boss; and a locking assembly having a locking buckle and an unlocking part connected with the locking buckle, the locking buckle and the unlocking part being rotatably connected with the first folding seat, respectively. The locking buckle is configured to move along with the first folding seat to be engaged with the second folding seat and the unlocking part is configured to move to abut against the position limiting boss when the foldable structure is in an unlocked state and the first folding seat rotates around the second folding seat in a first direction, to allow for the foldable structure to be switched to a pre-locked state. The position limiting boss is configured to prevent the unlocking part from rotating around the first folding seat to unlock the locking buckle in the pre-locked state. The handlebar is connected with the first folding seat. The deck is connected to the second folding seat through a diagonal rod. The rear fork is connected to the deck. The front wheel is rotatably connected to the second folding seat. The rear wheel is rotatably connected to the rear fork. The first folding seat and the handlebar are configured in at least one manner of moving towards the deck and moving away from the deck.

It is to be understood that both the foregoing general description and the following detailed description are illustrative and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with aspects related to the present disclosure as recited in the appended claims.

Terms used herein in the description of the present disclosure are only for the purpose of describing specific embodiments, but should not be construed to limit the present disclosure. As used in the description of the present disclosure and the appended claims, "a", "said" and "the" in singular forms mean to include plural forms, unless clearly indicated in the context otherwise. It should also be understood that, as used herein, the term "and/or" represents and contains any one and all possible combinations of one or more associated listed items.

It should be understood that, although terms such as first, second and third are used herein for describing various kinds of information in the present disclosure, such information should not be limited to these terms. These terms are only used for distinguishing the same type of information from each other. For example, without departing from the scope of the present disclosure, a first information may also be called as a second information, and similarly, the second information may also be called as the first information. Depending on the context, the term "if" may be construed to mean "when" or "upon" or "in response to determining".

Figure 1:
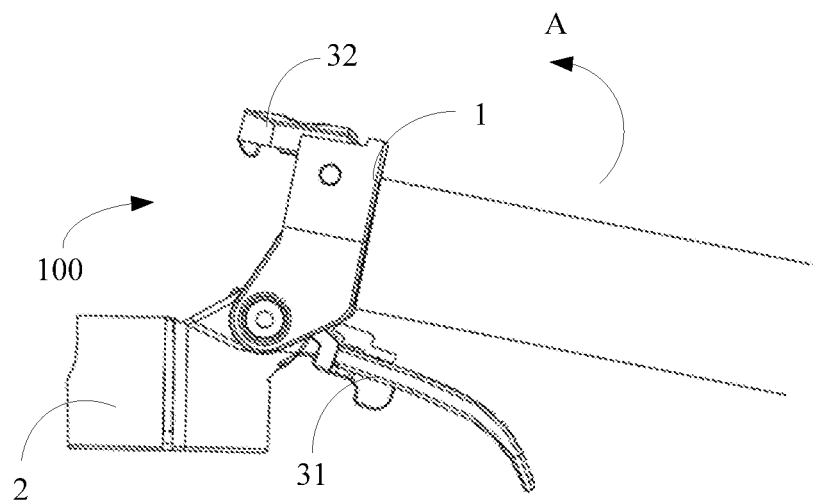
FIG. 1 is a schematic view of a foldable structure in an unlocked state according to an illustrative embodiment of the present disclosure.

FIG. 1 is a schematic view of a foldable structure in an unlocked state according to an illustrative embodiment. As illustrated in FIG. 1, the foldable structure 100 may include a first folding seat 1 and a second folding seat 2, and the first folding seat 1 may be rotatably connected with the second folding seat 2. Specifically, the first folding seat 1 and the second folding seat 2 may be engaged with each other in an axial direction, and may be rotatably connected through a rotation shaft at their edges on the same side, so that the first folding seat 1 may rotate around the rotation shaft to move towards the second folding seat 2, so as to achieve the folding and storage of the foldable structure 100. The first folding seat 1 may also rotate around the rotation shaft to move away from the second folding seat 2 so as to achieve the unfolding of the foldable structure 100. In order to achieve the locking between the first folding seat 1 and the second folding seat 2, as illustrated in FIGS. 1-4, the foldable structure 100 may also include a locking assembly 3, which may include a locking buckle 32 and an unlocking part 31 connected with the locking buckle 32, and the locking buckle 32 and the unlocking part 31 may be rotatably connected with the first folding seat 1, respectively. Specifically, the first folding seat 1 may include a rotation handle 11 and a seat body 12 connected with the rotation handle 11. The seat body 12 may include a relief cavity 121, a first rotation shaft 122 and a second rotation shaft 123, the first rotation shaft 122 may be rotatably connected with the locking buckle 32, and the second rotation shaft 123 may be rotatably connected with the unlocking part 31. In the embodiment of the present disclosure, the first folding seat 1 and the second folding seat 2 may also be rotatably connected through the second rotation shaft 123, the first rotation shaft 122 and the second rotation shaft 123 are both perpendicular to an axis of the rotation handle 11, and the unlocking part 31 may be connected to the locking buckle 32 along a radial direction of the rotation handle 11. As such, the unlocking part 31 and the locking buckle 32 may be arranged to two opposite sides of the rotation handle 11. Of course, in other embodiments, the first folding seat 1 and the second folding seat 2 may also be connected by another rotation shaft different from the second rotation shaft 123, which is not limited in the present disclosure.

Figure 2:
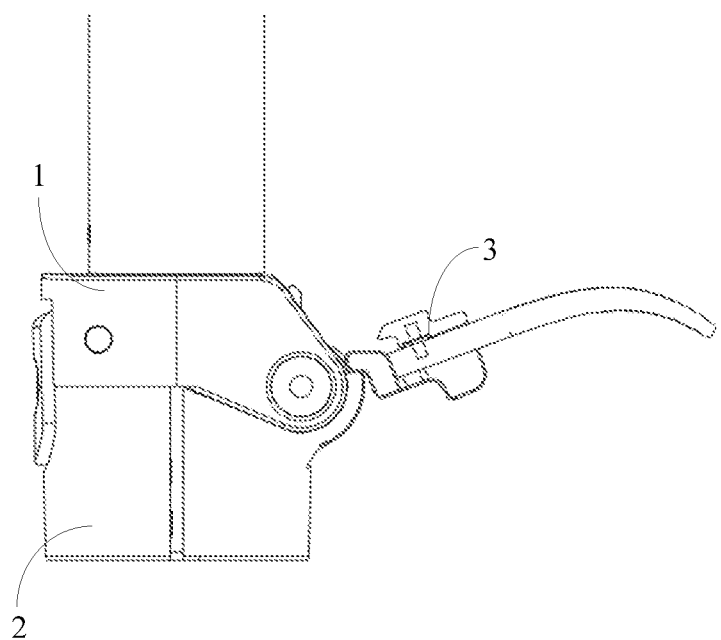
FIG. 2 is a schematic view of the foldable structure in FIG. 1 when the foldable structure is in a pre-locked state.
Figure 3:
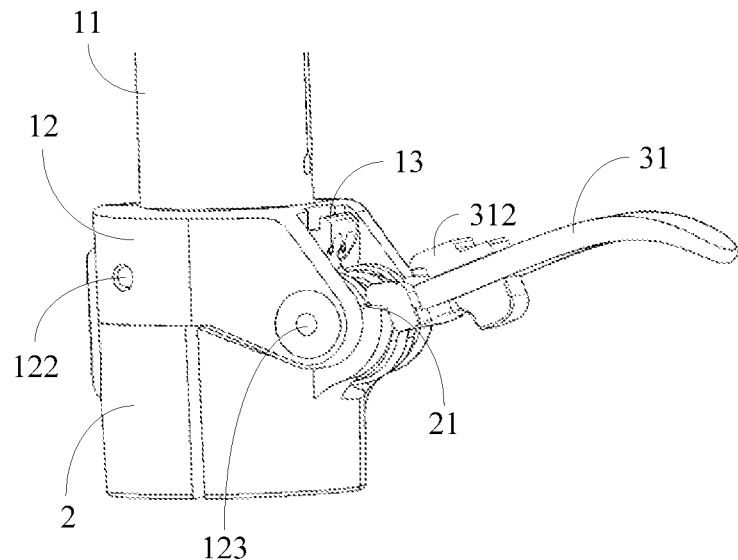
FIG. 3 is another schematic view of the foldable structure in FIG. 1 when the foldable structure is in a pre-locked state.
Figure 4:
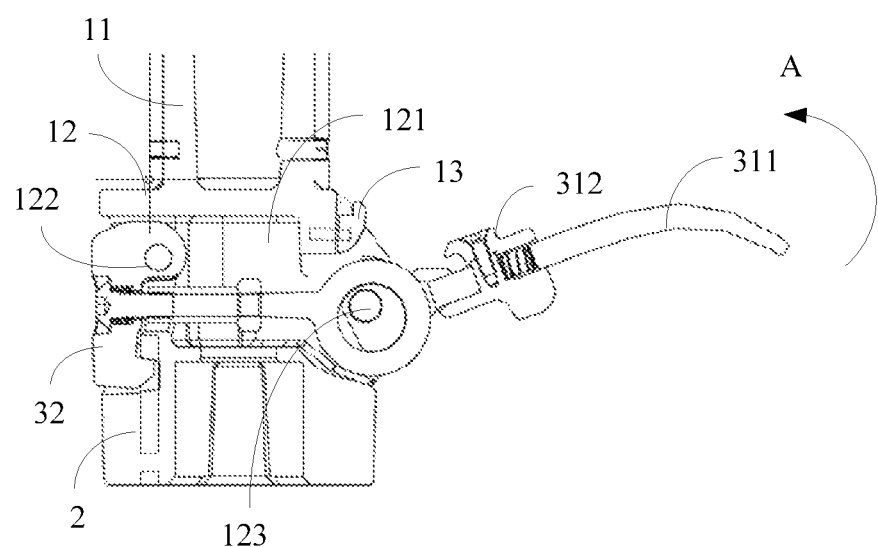
FIG. 4 is a sectional view of the foldable structure in FIG. 1 when the foldable structure is in a pre-locked state.

When the foldable structure 100 is in the unlocked state as illustrated in FIG. 1, the first folding seat 1 may rotate relative to the second folding seat 2, so that the first folding seat 1 may rotate towards the second folding seat 2 so as to achieve the storage. Moreover, in the state illustrated in FIG. 1, the first folding seat 1 may rotate around the second folding seat 2 through the second rotation shaft 123 in an anticlockwise direction as indicated by an arrow A in FIG. 2. Since the locking buckle 32 is connected with the first folding seat 1, the locking buckle 32 may also move along with the first folding seat 1 to be engaged with the second folding seat 2, as illustrated in FIG. 2, so as to lock the first folding seat 1 with the second folding seat 2. Furthermore, since the unlocking part 31 is connected with the locking buckle 32, the unlocking part 31 may move along with the locking buckle 32 and the first folding seat 1 to abut against a position limiting boss 21 of the second folding seat 2, as illustrated in FIG. 3. In this case, the foldable structure 100 may be switched to a pre-locked state as illustrated in FIG. 3 and FIG. 4. In the pre-locked state, the abutting of the position limiting boss 21 may prevent that the locking buckle 32 is pushed out to release the locking between the first folding seat 1 and the second folding seat 2 when the unlocking part 31 rotates along a clockwise direction.

As known from the above embodiments, in the present disclosure, when the first folding seat 1 and the second folding seat 2 rotate relative to each other until the locking buckle 32 is locked with the second folding seat 2, the unlocking part 31 is then limited at the position limiting boss 21, so that the unlocking part 31 cannot rotate around the first folding seat 1 to separate the locking buckle 32 from the second folding seat 2. Thus, a user does not need to fasten the unlocking part 31 manually, thereby avoiding the injury of the user caused by the unlocking of the locking buckle 32 and the relative rotation between the first folding seat 1 and the second folding seat 2, which are caused when the user neglects or forgets to manually fasten the unlocking part 31.

Figure 5:
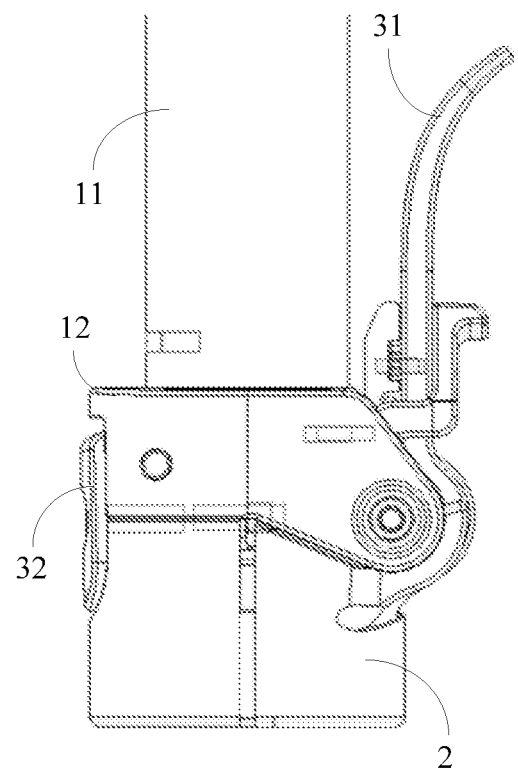
FIG. 5 is a schematic view of the foldable structure in FIG. 1 when the foldable structure is in a locked state.

Furthermore, as still illustrated in FIG. 4 and FIG. 5, the first folding seat 1 may also include a snapping groove 13, which may be formed in the seat body 12 or in the rotation handle 11. When the foldable structure 100 is in the pre-locked state, the user may continue to act on the unlocking part 31, so that the unlocking part 31 rotates around the first folding seat 1 in the anticlockwise direction as indicated by the arrow A, until the unlocking part 31 is snapped with the snapping groove 13. Thus, the foldable structure 100 may be switched from the pre-locked state to a locked state as illustrated in FIG. 5. Compared with the pre-locked state, when the unlocking part 31 rotates in the anticlockwise direction, since the unlocking part 31 is connected with the locking buckle 32, a component force in a direction from left to right in FIG. 5 may be applied to the locking buckle 32 so as to tighten the locking buckle 32 and enhance the locking stability. On the other hand, since the foldable structure 100 of the present disclosure is in the pre-locked state before being switched to the locked state, the risk caused when the user forgets to snap the unlocking part 31 to the snapping groove 13 can be reduced, and thus the safety of the foldable structure 100 is improved.

Figure 6:
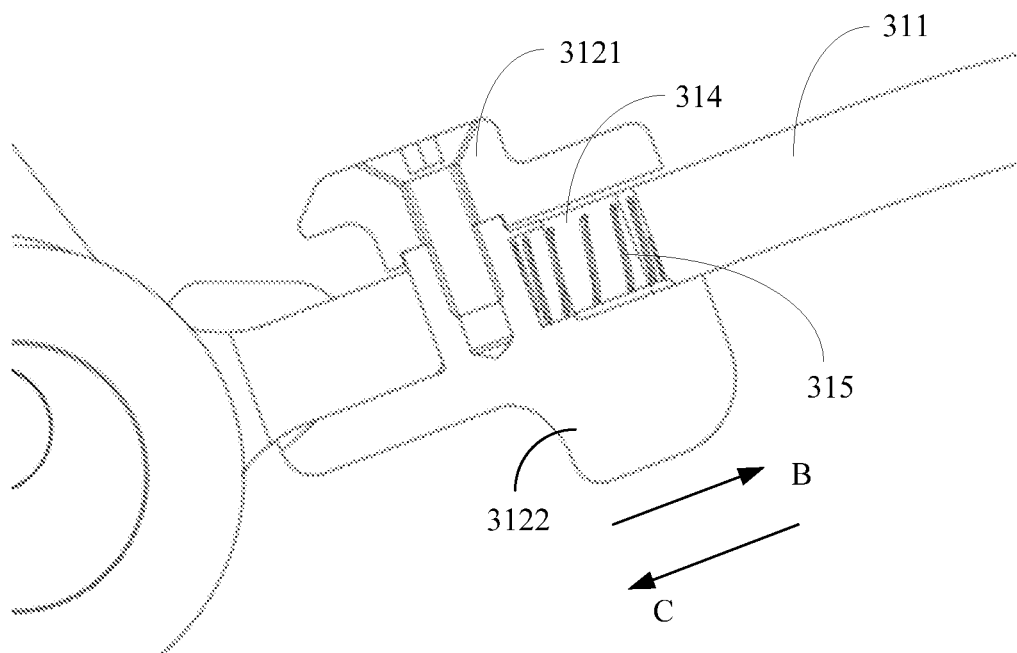
FIG. 6 is a schematic view of an unlocking part of the foldable structure in FIG. 1.
Figure 7:
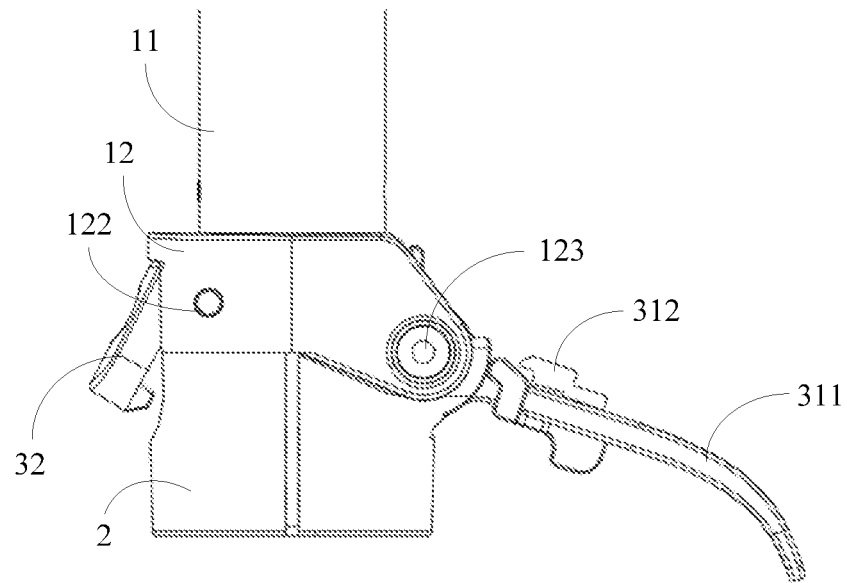
FIG. 7 is a schematic view of the foldable structure in FIG. 1 when the foldable structure is in another unlocked state.
Figure 8:
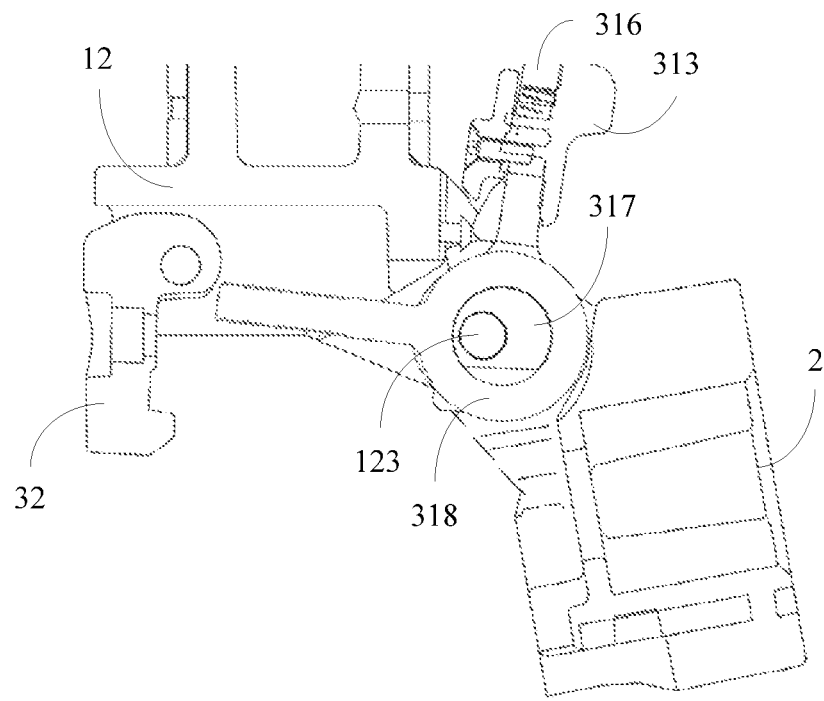
FIG. 8 is a sectional view of the foldable structure in FIG. 1 when the foldable structure is in the unlocked state.

Specifically, as illustrated in FIGS. 4-6, the unlocking part 31 may include an unlocking spanner 311 and a snapping portion 312 slidably connected with the unlocking spanner 311. The unlocking spanner 311 may include a guide groove 314 and a spring 315 arranged in the guide groove 314, one end of the spring 315 may abut against the snapping portion 312, and the other end of the spring 315 may abut against an inner wall of the guide groove 314. That is, at least part of the snapping portion 312 is slidably arranged in the guide groove 314, and the one end of the spring 315 abuts against the at least part of the snapping portion 312. In some embodiments, the other end of the spring 315 may be connected to the inner wall of the guide groove 314. Based on the above, in a process of snapping the snapping portion 312 with the snapping groove 13, the snapping portion 312 may press against the spring 315 to compress the spring 315 in a direction indicated by an arrow B. When the snapping portion 312 slides into the snapping groove 13, a restoring force of the spring 315 enables the spring 315 to stretch along a direction indicated by an arrow C, and to press the snapping portion 312 so as to move the snapping portion 312 towards a bottom of the snapping groove 13, thus achieving the snapping. Therefore, the foldable structure 100 is switched from the pre-locked state to the locked state. Of course, the directions indicated by the arrows B and C are only schematically illustrated relative to a current position of the unlocking spanner 311. After the position of the unlocking spanner 311 changes, the compression and elongation directions of the spring 315 also change accordingly. When the foldable structure is to be unlocked, the snapping portion 312 may be slid relative to the guide groove 314, and separated from the snapping groove 13, and then the unlocking part 31 may be further rotated clockwise around the second rotation shaft 123. Since the snapping portion 312 has moved away from the snapping groove 13, the snapping portion 312 may avoid the position limiting boss 21 during unlocking, so that the foldable structure 100 may be switched to the unlocked state illustrated in FIG. 7 or FIG. 8.

Furthermore, when switching from the unlocked state to the pre-locked state, the locking buckle 32 drives the unlocking part 31 to rotate anticlockwise. Due to the space between the position limiting boss 21 and the unlocking part 31, the restoring force of the spring 315 may drive the snapping portion 312 to move towards the position limiting boss 21 until the snapping portion 312 abuts against the position limiting boss 21, so as to achieve the pre-locking.

In the embodiment provided by the present disclosure, as illustrated in FIG. 6, the snapping portion 312 may include a first sub-snapping portion 3121 and a second sub-snapping portion 3122 connected with the first sub-snapping portion 3121. The first sub-snapping portion 3121 is arranged closer to the snapping groove 13 than the second sub-snapping portion 3122, so as to be snapped with the snapping groove 13, and the second sub-snapping portion 3122 is arranged closer to the second folding seat 2 than the first sub-snapping portion 3121, so as to abut against the position limiting boss 21. The second sub-snapping portion 3122 abuts against the spring 315. Through the connection of the first sub-snapping portion 3121 and the second sub-snapping portion 3122, the spring 315 may simultaneously press against the first sub-snapping portion 3121 and the second sub-snapping portion 3122. Of course, in other embodiments, the snapping portion 312 may also have an integral structure. Of course, in other embodiments, the spring 315 may also directly abut against the first sub-snapping portion 3121, or directly abut against the first sub-snapping portion 3121 and the second sub-snapping portion 3122 simultaneously, which is not limited in the present disclosure.

It should be noted that, in addition to the spring 315, an elastic piece may also be arranged in the guide groove 314, and press against the snapping portion 312, so that the snapping portion 312 may reset automatically.

In each of the above embodiments, the unlocking spanner 311 may include a gripping portion 316, a first eccentric wheel 317, and a connecting rod 318. The snapping portion 312 is arranged on the gripping portion 316, the first eccentric wheel 317 may be connected to the gripping portion 316 and rotatably connected with the second rotation shaft 123, one end of the connecting rod 318 is connected with the first eccentric wheel 317, and the other end of the connecting rod 318 is connected with the locking buckle 32. As such, when the snapping portion 312 is separated from the snapping groove 13, and the gripping portion 316 rotates relative to the first folding seat 1 in the clockwise direction, the first eccentric wheel 317 may rotate clockwise relative to the second rotation shaft 123, so that an eccentric structure of the first eccentric wheel 317 may be used to press against the connecting rod 318, so as to act on the locking buckle 32, and then the locking buckle 32 rotates in the clockwise direction relative to the first folding seat 1, so as to be separated from the second folding seat 2. Thus, the foldable structure 100 is switched to the unlocked state. When the first folding seat 1 rotates in the anticlockwise direction relative to the second folding seat 2, under the joint action of the locking buckle 32 and the first folding seat 1, the snapping portion 312 of the unlocking part 31 may abut against the position limiting boss 21, and thus the foldable structure 100 is switched to the pre-locked state. Further, the gripping portion 316 is operated to rotate in the anticlockwise direction relative to the first folding seat 1, so that the snapping portion 312 may be snapped with the snapping groove 13, and thus the foldable structure 100 is switched to the locked state.

The connecting rod 318 may be directly connected with an edge of the first eccentric wheel 317. Or, as illustrated in the embodiment provided in the present disclosure, the connecting rod 218 may include a rod body and a circular hole formed in the rod body. The rod body is connected with the locking buckle 32, the first eccentric wheel 317 is arranged in the circular hole, and an axis of the second rotation shaft 123 is separated from a center of the circular hole, i.e. a rotation center of the first eccentric wheel 317 is separated from the center of the circular hole. Thus, the connection rod 318 may be pulled through the action of the first eccentric wheel 317, so that the locking buckle 32 is pulled to move towards the second folding seat 2, or the connection rod 318 is pushed through the action of the first eccentric wheel 317, so that the locking buckle 32 is pushed out to be separated from the second folding seat 2.

Figure 9:
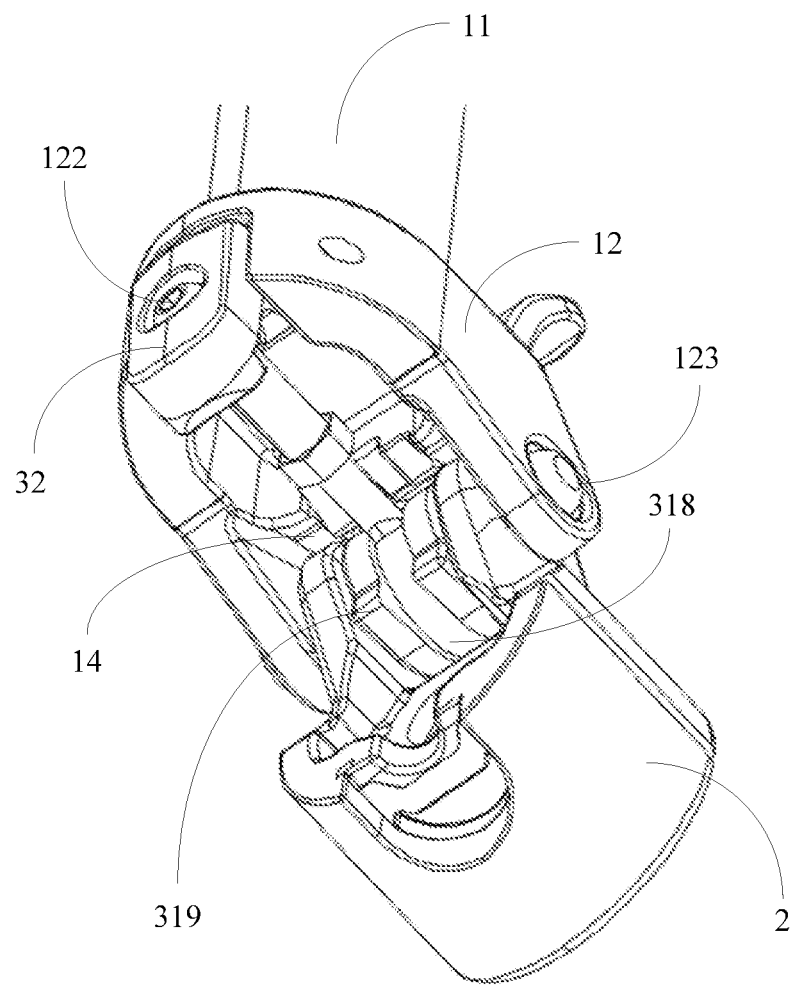
FIG. 9 is a schematic view of the foldable structure in FIG. 1 from another perspective.

As illustrated in FIG. 4 and FIG. 9, the first folding seat 1 may also include an elastic piece 14 arranged in the relief cavity 121, the unlocking spanner 311 may also include one or more second eccentric wheels 319 configured to rotate synchronously with the first eccentric wheel 317, and each of the one or more second eccentric wheels 319 may be fixedly connected with the first eccentric wheel 317. In some embodiments, the one or more second eccentric wheels 319 are further configured to rotate coaxially with the first eccentric wheel 317. When the unlocking part 31 rotates clockwise to unlock the foldable structure 100, both the first eccentric wheel 317 and the second eccentric wheel 319 may rotate clockwise around the second rotation shaft 123, the first eccentric wheel 317 presses against the connecting rod 318, and the second eccentric wheel 319 presses against the elastic piece 14, so that when the foldable structure 100 is in the unlocked state, the elastic piece 14 may provide the second eccentric wheel 319 with a restoring force to drive the second eccentric wheel 319 to rotate in the anticlockwise direction. When the first folding seat 1 drives the locking buckle 32 to move to be engaged with the second folding seat 2, the first eccentric wheel 317 is pushed to rotate anticlockwise by the connecting rod 318. Under the action of the elastic piece 14 and the spring 315, the snapping portion 312 may quickly rotate anticlockwise along with the unlocking spanner 311 to abut against the position limiting boss 21, thus improving the hand feeling of the user during locking.

In the above embodiments, illustrations are made by taking an example that a first direction is the anticlockwise direction and a second direction is the clockwise direction. In other embodiments, the first direction may also be the clockwise direction and the second direction may also be the anticlockwise direction, which is not limited in the present disclosure.

Figure 10:
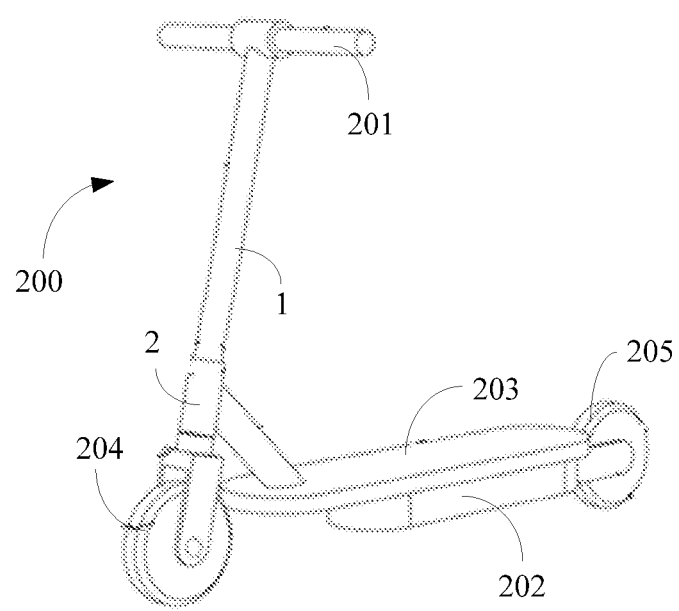
FIG. 10 is a schematic view of a foldable vehicle according to an illustrative embodiment of the present disclosure.

Based on the foldable structure 100 provided in the above embodiments, the present disclosure also provides a foldable vehicle 200 as illustrated in FIG. 10. The foldable vehicle 20 may include a foldable structure 100, a handlebar 201, a rear fork 202, a deck 203, a front wheel 204 and a rear wheel 205. The first folding seat 1 of the foldable structure 100 may be connected with the handlebar 201, and the second folding seat 2 of the foldable structure 100 may be connected with the deck 203 through a diagonal bar. As such, the first folding seat 1 may drive the handlebar 201 to move around the second folding seat 2 towards the deck 203, and thus the foldable vehicle 200 may be switched to a folded state. Or, the first folding seat 1 may drive the handlebar 201 to move around the second folding seat 2 away from the deck 203, so that the foldable vehicle 200 may be switched to an unfolded state, while the foldable structure 100 is in the pre-locked state in this case, so as to avoid the folding of the foldable vehicle 200 caused by an unintentional touch with the locking assembly 3 during riding, thus enhancing the safety. The foldable vehicle 200 may include a scooter, which may be an adult scooter or a child scooter.

In addition to the foldable vehicle illustrated in the above embodiments, the foldable structure 100 may also be applied to other foldable devices so as to achieve a relative folding between components of the foldable device, or a relative folding between parts of the foldable device. For example, the foldable device may include a monitoring platform, and a camera of the monitoring platform may be arranged to the first folding seat or the second folding seat, so that a position of the camera may be adjusted through the relative movement of the first folding seat and the second folding seat, and may be locked during the monitoring. The foldable device may also include other devices.

Other embodiments of the present disclosure will be apparent to those skilled in the art from consideration of the specification and practice of the present disclosure disclosed herein. This application is intended to cover any variations, uses, or adaptations of the present disclosure following the general principles thereof and including such departures from the present disclosure as come within known or customary practice in the art. It is intended that the specification and examples should be considered as illustrative only.

It will be appreciated that the present disclosure is not limited to the exact construction that has been described above and illustrated in the accompanying drawings, and that various modifications and changes may be made without departing from the scope thereof.

What is claimed is:

1. A foldable structure, comprising:
a first folding seat;
a second folding seat rotatably connected with the first folding seat and having a position limiting boss; and
a locking assembly having a locking buckle and an unlocking part connected with the locking buckle, the locking buckle and the unlocking part being rotatably connected with the first folding seat, respectively,
wherein the locking buckle is configured to move along with the first folding seat to be engaged with the second folding seat and the unlocking part is configured to move to abut against the position limiting boss when the foldable structure is in an unlocked state and the first folding seat rotates around the second folding seat in a first direction, to allow for the foldable structure to be switched to a pre-locked state, and
wherein the position limiting boss is configured to prevent the unlocking part from rotating around the first folding seat to unlock the locking buckle in the pre-locked state,
wherein the first folding seat comprises a snapping groove, and the unlocking part is configured to rotate relative to the first folding seat in the first direction to be snapped with the snapping groove when the foldable structure is in the pre-locked state, to allow for the foldable structure to be switched to a locked state,
wherein the unlocking part comprises an unlocking spanner and a snapping portion slidably connected with the unlocking spanner, the snapping portion is configured to be snapped with the snapping groove when the foldable structure is in the locked state, and the snapping portion is configured to abut against the position limiting boss when the foldable structure is in the pre-locked state;
the snapping portion is configured to slide relative to the unlocking spanner in a direction running away from the snapping groove, and to be separated from the snapping groove when the foldable is to be switched from the locked state to the unlocked state, and the snapping portion is further configured to avoid the position limiting boss when the unlocking part moves in a second direction relative to the first folding seat, to allow for the foldable to be switched to the unlocked state,
wherein the unlocking spanner comprises:
a gripping portion, the snapping portion being arranged to the gripping portion;
a first eccentric wheel connected to an end of the gripping portion;
a connecting rod, one end of the connecting rod being connected with the first eccentric wheel, and another end of the connecting rod being connected with the locking buckle,
wherein the first eccentric wheel is configured to push the locking buckle through the connecting rod to rotate in the second direction relative to the first folding seat, to allow for the locking buckle to be disengaged from the second folding seat, when the snapping portion is separated from the snapping groove, and the gripping portion rotates in the second direction relative to the first folding seat,
wherein the first folding seat comprises an elastic piece, and the unlocking spanner further comprises a second eccentric wheel configured to rotate synchronously with the first eccentric wheel;

the snapping portion is configured to be separated from the snapping groove, the gripping portion is configured to rotate in the second direction, and the second eccentric wheel is configured to press against the elastic piece when the foldable structure is to be switched to the unlocked state; and the elastic piece is configured to provide a restoring force to drive the first eccentric wheel and the second eccentric wheel to rotate in the first direction when the foldable structure is to be switched to the pre-locked state.

2. The foldable structure according to claim 1, wherein the unlocking spanner comprises a guide groove and a spring arranged in the guide groove, one end of the spring abuts against the snapping portion, the other another end of the spring is connected to an inner wall of the guide groove, and at least part of the snapping portion is slidably arranged in the guide groove;

the snapping portion is configured to be apart from the position limiting boss, and the spring is configured to be compressed, when the foldable structure is in the unlocked state; and the unlocking part is configured to rotate in the first direction, and the spring is configured to act on the snapping portion so that the snapping portion abuts against the position limiting boss, when the foldable structure is to be switched to the pre-locked state.

3. The foldable structure according to claim 2, wherein the snapping portion comprises a first sub-snapping portion and a second sub-snapping portion connected to the first sub-snapping portion, the first sub-snapping portion is configured to be snapped with the snapping groove when the foldable structure is in the locked state, the second sub-snapping portion is configured to abut against the position limiting boss when the foldable structure is in the pre-locked state, and the spring is configured to abut against at least one of the first sub-snapping portion and the second sub-snapping portion.

4. The foldable structure according to claim 1, wherein the connecting rod comprises a rod body and a circular hole formed in the rod body, the rod body is connected with the locking buckle, the first eccentric wheel is arranged in the circular hole, and a rotation center of the first eccentric wheel is separated from a center of the circular hole.

5. The foldable structure according to claim 1, wherein the first folding seat comprises a rotation handle and a seat body, the seat body is connected with the rotation handle, the seat body comprises a relief cavity, a first rotation shaft and a second rotation shaft, each of the first rotation shaft and the second rotation shaft is perpendicular to an axis of the rotation handle;

the unlocking part is rotatably connected with the second rotation shaft, the locking buckle is rotatably connected with the first rotation shaft, a part of the unlocking part passes through the relief cavity along a radial direction of the rotation handle to be connected to the locking buckle.

6. A foldable device, comprising a foldable structure, the foldable structure comprising:
a first folding seat;
a second folding seat rotatably connected with the first folding seat and having a position limiting boss; and
a locking assembly having a locking buckle and an unlocking part connected with the locking buckle, the locking buckle and the unlocking part being rotatably connected with the first folding seat, respectively, wherein the locking buckle is configured to move along with the first folding seat to be engaged with the second folding seat and the unlocking part is configured to move to abut against the position limiting boss, when the foldable structure is in an unlocked state and the first folding seat rotates around the second folding seat in a first direction, to allow for the foldable structure to be switched to a pre-locked state, the position limiting boss is configured to prevent the unlocking part from rotating around the first folding seat to unlock the locking buckle in the pre-locked state, wherein the first folding seat comprises a snapping groove, and the unlocking part is configured to rotate relative to the first folding seat in the first direction to be snapped with the snapping groove when the foldable structure is in the pre-locked state, to allow for the foldable structure to be switched to a locked state, wherein the unlocking part comprises an unlocking spanner and a snapping portion slidably connected with the unlocking spanner, the snapping portion is configured to be snapped with the snapping groove when the foldable structure is in the locked state, and the snapping portion is configured to abut against the position limiting boss when the foldable structure is in the pre-locked state;

the snapping portion is configured to slide relative to the unlocking spanner in a direction running away from the snapping groove, and to be separated from the snapping groove when the foldable is to be switched from the locked state to the unlocked state, and the snapping portion is further configured to avoid the position limiting boss when the unlocking part moves in a second direction relative to the first folding seat, to allow for the foldable to be switched to the unlocked state, wherein the unlocking spanner comprises:
a gripping portion, the snapping portion being arranged to the gripping portion;
a first eccentric wheel connected to an end of the gripping portion;
a connecting rod, one end of the connecting rod being connected with the first eccentric wheel, and another end of the connecting rod being connected with the locking buckle, wherein the first eccentric wheel is configured to push the locking buckle through the connecting rod to rotate in the second direction relative to the first folding seat, to allow for the locking buckle to be disengaged from the second folding seat, when the snapping portion is separated from the snapping groove, and the gripping portion rotates in the second direction relative to the first folding seat, wherein the first folding seat comprises an elastic piece, and the unlocking spanner further comprises a second eccentric wheel configured to rotate synchronously with the first eccentric wheel;

the snapping portion is configured to be separated from the snapping groove, the gripping portion is configured to rotate in the second direction, and the second eccentric wheel is configured to press against the elastic piece when the foldable structure is to be switched to the unlocked state; and the elastic piece is configured to provide a restoring force to drive the first eccentric wheel and the second eccentric wheel to rotate in the first direction when the foldable structure is to be switched to the pre-locked state.

7. A foldable vehicle, comprising:
a foldable structure:
   a first folding seat;
   a second folding seat rotatably connected with the first folding seat and having a position limiting boss; and
   a locking assembly having a locking buckle and an unlocking part connected with the locking buckle, the locking buckle and the unlocking part being rotatably connected with the first folding seat, respectively,
   wherein the locking buckle is configured to move along with the first folding seat to be engaged with the second folding seat and the unlocking part is configured to move to abut against the position limiting boss, when the foldable structure is in an unlocked state and the first folding seat rotates around the second folding seat in a first direction, to allow for the foldable structure to be switched to a pre-locked state,
   the position limiting boss is configured to prevent the unlocking part from rotating around the first folding seat to unlock the locking buckle in the pre-locked state;
a handlebar connected with the first folding seat;
a deck connected to the second folding seat through a diagonal rod;
a rear fork connected to the deck;
a front wheel rotatably connected to the second folding seat; and
a rear wheel rotatably connected to the rear fork,
wherein the first folding seat and the handlebar are configured in at least one manner of moving towards the deck and moving away from the deck,
wherein the first folding seat comprises a snapping groove, and the unlocking part is configured to rotate relative to the first folding seat in the first direction to be snapped with the snapping groove, when the foldable structure is in the pre-locked state, to allow for the foldable structure to be switched to a locked state,
wherein the unlocking part comprises an unlocking spanner and a snapping portion slidably connected with the unlocking spanner, the snapping portion is configured to be snapped with the snapping groove when the foldable structure is in the locked state, and the snapping portion is configured to abut against the position limiting boss when the foldable structure is in the pre-locked state;
the snapping portion is configured to slide relative to the unlocking spanner in a direction running away from the snapping groove, and to be separated from the snapping groove when the foldable is to be switched from the locked state to the unlocked state, and the snapping portion is further configured to avoid the position limiting boss when the unlocking part moves in a second direction relative to the first folding seat, to allow for the foldable structure to be switched to the unlocked state,
wherein the unlocking spanner comprises:
a gripping portion, the snapping portion being arranged to the gripping portion;
a first eccentric wheel connected to an end of the gripping portion;
a connecting rod, one end of the connecting rod being connected with the first eccentric wheel, and another end of the connecting rod being connected with the locking buckle,
wherein the first eccentric wheel is configured to push the locking buckle through the connecting rod to rotate in the second direction relative to the first folding seat, to allow for the locking buckle to be disengaged from the second folding seat, when the snapping portion is separated from the snapping groove, and the gripping portion rotates in the second direction relative to the first folding seat,
wherein the first folding seat comprises an elastic piece, and the unlocking spanner further comprises a second eccentric wheel configured to rotate synchronously with the first eccentric wheel;
the snapping portion is configured to be separated from the snapping groove, the gripping portion is configured to rotate in the second direction, and the second eccentric wheel is configured to press against the elastic piece when the foldable structure is to be switched to the unlocked state; and
the elastic piece is configured to provide a restoring force to drive the first eccentric wheel and the second eccentric wheel to rotate in the first direction when the foldable structure is to be switched to the pre-locked state.

8. The foldable vehicle according to claim 7, wherein the unlocking spanner comprises a guide groove and a spring arranged in the guide groove, one end of the spring abuts against the snapping portion, another end of the spring is connected to an inner wall of the guide groove, and at least part of the snapping portion is slidably arranged in the guide groove;
the snapping portion is configured to be apart from the position limiting boss, and the spring is configured to be compressed, when the foldable structure is in the unlocked state; and
the unlocking part is configured to rotate in the first direction, and the spring is configured to act on the snapping portion so that the snapping portion abuts against the position limiting boss, when the foldable structure is to be switched to the pre-locked state.

9. The foldable vehicle according to claim 8, wherein the snapping portion comprises a first sub-snapping portion and a second sub-snapping portion connected to the first sub-snapping portion, the first sub-snapping portion is configured to be snapped with the snapping groove when the foldable structure is in the locked state, the second sub-snapping portion is configured to abut against the position limiting boss when the foldable structure is in the pre-locked state, and the spring is configured to abut against at least one of the first sub-snapping portion and the second sub-snapping portion.

10. The foldable vehicle according to claim 7, wherein the connecting rod comprises a rod body and a circular hole formed in the rod body, the rod body is connected with the locking buckle, the first eccentric wheel is arranged in the circular hole, and a rotation center of the first eccentric wheel is separated from a center of the circular hole.

11. The foldable vehicle according to claim 7, wherein the first folding seat comprises a rotation handle and a seat body, the seat body is connected with the rotation handle, the seat body comprises a relief cavity, a first rotation shaft and a second rotation shaft, each of the first rotation shaft and the second rotation shaft is perpendicular to an axis of the rotation handle;

the unlocking part is rotatably connected with the second rotation shaft, the locking buckle is rotatably connected with the first rotation shaft, a part of the unlocking part passes through the relief cavity along a radial direction of the rotation handle to be connected to the locking buckle.

12. The foldable vehicle according to claim 7, wherein the first folding seat is configured to drive the handlebar to move towards the deck to allow for the foldable vehicle to be switched to a folded state, and further to drive the handlebar to move away from the deck to allow for the foldable vehicle to be switched to an unfolded state.

* * * * *